_United States Patent_ [19]

Yabune et al.

[11] 4,439,605

[45] Mar. 27, 1984

[54] PROCESS FOR PRODUCING CELLULOSE ACETATE

[75] Inventors: Hideo Yabune, Himeji; Yoshiyuki Ikemoto, Yokohama; Younosuke Kato, Hyogo; Manabu Uchida, Himeji, all of Japan

[73] Assignee: Daicel Chemical Industries, Ltd., Sakai, Japan

[21] Appl. No.: 433,615

[22] Filed: Oct. 12, 1982

[30] Foreign Application Priority Data

Nov. 30, 1981 [JP] Japan ................................ 56-192042

[51] Int. Cl.$^3$ ............................................. C08B 3/06
[52] U.S. Cl. ........................................ 536/71; 536/69; 536/73
[58] Field of Search ............................. 536/69, 71, 73

[56] References Cited

U.S. PATENT DOCUMENTS

| | | | |
|---|---|---|---|
| 2,923,706 | 2/1960 | Campbell et al. | 536/73 |
| 3,767,642 | 10/1973 | Campbell et al. | 536/69 |
| 4,269,972 | 5/1981 | Yabune et al. | 536/71 |
| 4,306,060 | 12/1981 | Ikemoto | 536/71 |

FOREIGN PATENT DOCUMENTS

| | | | |
|---|---|---|---|
| 565099 | 10/1958 | Canada | 536/73 |
| 36-8345 | 2/1958 | Japan | 536/69 |
| 429739 | 6/1935 | United Kingdom | 536/76 |

OTHER PUBLICATIONS

Chemical Abstracts, vol. 95, No. 16, Oct. 19, 1981, Abstract No. 95:134650g at p. 96.

_Primary Examiner_—Ronald W. Griffin
_Attorney, Agent, or Firm_—Flynn, Thiel, Boutell & Tanis

[57] ABSTRACT

A process for producing cellulose diacetate is disclosed which comprises the steps of:

(a) pretreating and activating 100 parts by weight of cellulose, adding a mixture of 200 to 400 parts of acetic anhydride, 0 to 350 parts of glacial acetic acid, and 0.5 to 5 parts of acid catalyst, heating the reactants to a temperature from 50° C. to 85° C. at approximately a constant rate, maintaining this temperature for 3 to 20 minutes, thereby acetylating cellulose to form primary cellulose acetate;

(b) neutralizing the acid catalyst in the reaction mixture containing primary cellulose acetate obtained in step (a), introducing steam under pressure into the system to change the temperature of the system to 125° C. to 170° C., and maintaining this temperature for 30 minutes to 6 hours, thereby hydrolyzing the primary cellulose acetate to accomplish ripening; and (c) flashing the ripened reaction mixture at a temperature of 125° C. to 170° C. by discharging same to the ambient atmosphere, recovering by condensation the gas generated during flashing having an acetic acid/water weight ratio of 70-80/30-20, and simultaneously cooling the remaining liquid reaction mixture to about 100° C., thereby substantially stopping the hydrolysis reaction.

10 Claims, 1 Drawing Figure

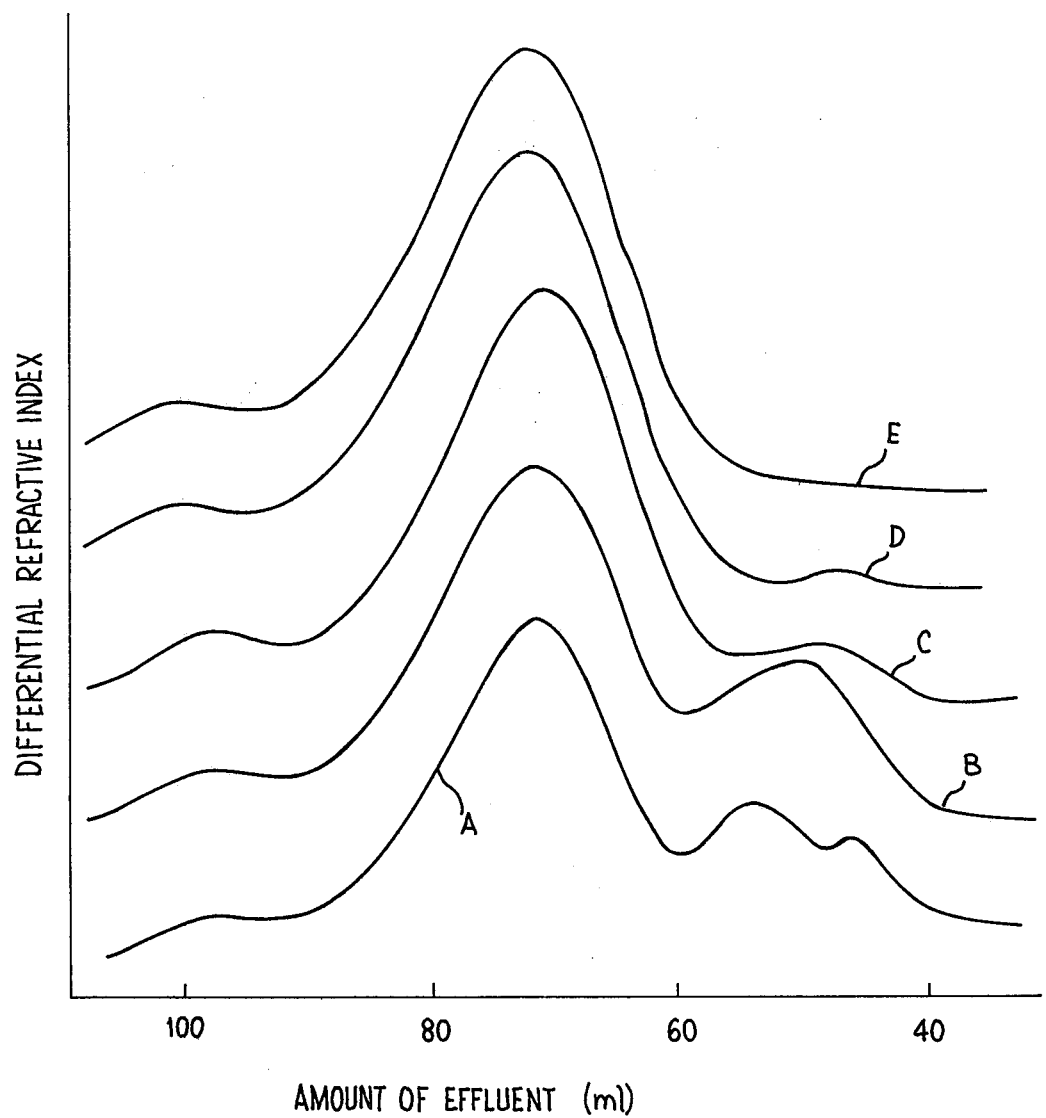

PROCESS FOR PRODUCING CELLULOSE ACETATE

The present invention relates to a process for producing cellulose acetate. More particularly, it relates to a process for producing a secondary cellulose acetate having a combined acetic acid amount of 49 to 58%, that is, approximately cellulose diacetate, said process comprising performing the acetylation at a high temperature for a short time, in the presence of a small quantity of acid catalyst, and subsequently complete neutralizing the catalyst and hydrolyzing at a high temperature under pressure.

Typical industrial processes for producing secondary cellulose acetate fall in two broad categories. The first is the so-called acetic acid process in which acetic acid is used as a diluent, and sulfuric acid is used as a catalyst. The second is the so-called methylene chloride process in which acetic anhydride is used as an acetylating agent, methylene chloride is used as a diluent, and sulfuric acid is used as a catalyst. The present invention relates to an improvement of the acetic acid-type process.

The conventional acetic acid process for producing cellulose acetate is outlined below. This process comprises (1) a pretreatment and activation step in which cellulosic raw material containing a comparatively high content of α-cellulose is disintegrated, sprayed and mixed with acetic acid alone or together with a small quantity of acid catalyst, (2) an acetylation step in which the activated cellulose obtained in step (1) is treated with a previously cooled acid mixture of acetic anhydride, acetic acid, and acid catalyst (such as sulfuric acid) to produce primary cellulose acetate, namely, approximately cellulose triacetate, (3) a ripening step in which the primary cellulose acetate obtained in the acetylation step (2) is hydrolyzed to the desired degree of acetylation, to give secondary cellulose acetate, approximately cellulose diacetate, and (4) an after-treatment step in which the resulting secondary cellulose acetate is separated from the reaction solution, purified, stabilized and dried.

This acetic acid process has the following three disadvantages.

(a) If the secondary cellulose acetate produced is to meet industrial requirements for quality and performance, cellulosic raw material of high quality containing a high content of α-cellulose is required. In the case of using a dissolving wood pulp, the highest grade of pulp is used for producing cellulose acetate.

(b) In order to carry out uniform acetylation of the cellulose and to obtain a product which is good in filtering and spinning properties, it is necessary to use a large amount of acid catalyst, specifically sulfuric acid, usually 10 to 16 parts by weight of the acid per 100 parts of the starting cellulose. This catalyst cannot be recovered and reused, and a neutralizing agent is used after the reaction is complete. This increases the production cost.

(c) Since the above-mentioned acetylation step (2) is a vigorous exothermic reaction, it is necessary to cool the mixture of acetic anhydride, acetic acid and sulfuric acid prior to the step (2). It is also necessary to cool the reactor externally with a proper coolant, such as brine, and regulate the acetylation temperature after the pretreated cellulose has been charged into the reactor. Such cooling is important in preventing the degradation of the cellulose and in maintaining the appropriate degree of polymerization of the final secondary cellulose acetate product. Cooling the raw materials and removing reaction heat require a great deal of energy. This leads to an increase in the production cost of the cellulose acetate in these days of high energy costs.

Attempts have been made to improve the aforesaid process which involves the three problems mentioned above. For instance, there has been proposed in U.S. Pat. No. 2,923,706 an improvement to solve the second and third problems (b) and (c). According to this patent, sulfuric acid is used in an amount of from 0.02 to 0.1 parts by weight and the final acetylation temperature is kept at 50° to 60° C., depending on the amount of sulfuric acid present so as to prevent the intrinsic viscosity from decreasing. In this manner, cellulose triacetate containing a minimum amount of gel is obtained.

There has also been proposed in Canadian Pat. No. 565 099 an improvement for solving the second and third problems (b) and (c). According to this patent, sulfuric acid is used in an amount of from 0.02 to 1.0 parts by weight and the maximum acetylation temperature is kept in the range of from 50° C. to the boiling point of acetic acid, depending on the amount of sulfuric acid present. In this manner, cellulose triacetate containing a minimum amount of gel and having good thermal stability is obtained. It is to be noted that these patents relates to the production of cellulose triacetate, but not to the production of cellulose diacetate to which the present invention relates.

There has been proposed in U.S. Pat. No. 3,767,642 an improvement for solving the problem (a). According to this patent, primary cellulose acetate is obtained by the conventional acetylation method, the sulfuric acid catalyst in the reaction system is neutralized completely and then the reaction mixture is ripened at a temperature from 125° C. to 170° C. to produce secondary cellulose acetate which is good in the filtering property and clarity and which indicates a low false viscosity effect. This process allows low quality wood pulp with a low content of α-cellulose to be used as a starting material.

There has been proposed in Japanese Patent Laid-Open No. 59801/1981 an improvement to solve the three problems (a), (b) and (c) simultaneously. According to this patent, sulfuric acid is used in an amount of from 0.5 to 3 parts by weight, per 100 parts by weight of the starting cellulose and the acetylation temperature is kept at 50° C. to 85° C. whereby to complete acetylation in a short time. After formation of the primary cellulose acetate, the sulfuric acid catalyst in the system is neutralized completely, and the reactants are allowed to ripen at a temperature from 110° C. to 120° C. to produce the secondary cellulose acetate. This technique is characterized in that secondary cellulose acetate having a good filtering property can be obtained and low quality wood pulp with a low content of α-cellulose can be utilized. Ripening after complete neutralization of sulfuric acid, at a high temperature (110° C. to 120° C.) is responsible for this improvement.

In the conventional process in which sulfuric acid is used in small quantities and acetylation is performed in a short time at a high temperature to give primary cellulose acetate, the ripening process, which is saponification with a small amount of sulfuric acid, at a comparatively low temperature (40° C. to 90° C.), results in secondary cellulose acetate containing a large amount of gel and having a poor filtering property.

Based on the above-mentioned known prior art, the present inventors carried out a series of intensive studies to solve the problems (a), (b) and (c).

The present invention relates to an improved process for producing cellulose diacetate, which comprises the steps of:

(a) pretreating and activating 100 parts by weight of cellulose, adding thereto a mixture of 200 to 400 parts by weight of acetic anhydride, 0 to 350 parts by weight of glacial acetic acid, and 0.5 to 5 parts by weight of acid catalyst, heating the reactants to a temperature from 50° C. to 85° C. at an approximately constant rate, and maintaining this temperature for 3 to 20 minutes, thereby acetylating the cellulose to produce primary cellulose acetate;

(b) neutralizing the acid catalyst in the reaction mixture of the primary cellulose acetate obtained in the above step (a), introducing steam under pressure into the system to change the temperature in the system to a temperature in the range of 125° C. to 170° C., and maintaining this temperature for 30 minutes to 6 hours, thereby hydrolyzing the primary cellulose acetate to secondary cellulose acetate;

(c) flashing the ripened reaction mixture, which is at a temperature of 125° C. to 170° C., discharging it into the atmosphere under normal pressure, recovering by condensation the thus-produced gas which has an acetic acid/water weight ratio of 70–80/30–20 generated by the flashing, and simultaneously cooling the liquid phase reaction mixture to about 100° C., thereby substantially stopping the hydrolysis reaction.

BRIEF DESCRIPTION OF THE DRAWING

The drawing is a gel permeation chromatograph of several kinds of secondary cellulose acetates produced at different ripening temperatures. The ordinate represents the differential refractive index of the sample solutions, and the abscissa represents the amount of effluent.

The present invention will now be described in detail.

According to the process of this invention, cellulose diacetate is produced by the following four steps: a first step for pretreating and activating material cellulose, a second step for acetylation, a third step for neutralization and ripening, a fourth step for stopping the ripening process and separating and collecting the cellulose diacetate. The initial pretreatment step is necessary in order smoothly to perform the acetylation step because the acetylation reaction is performed in the presence of a small amount of acid catalyst. The sulfuric acid which is used as a catalyst for acetylation of cellulose is also a good penetrating and swelling agent for cellulose. The difference in reaction rate between the amorphous portion and the crystalline portion of the starting cellulose is eliminated effectively by the use of sulfuric acid. Therefore, if complete acetylation is to be performed with a small quantity of sulfuric acid, it is necessary to weaken the hydrogen bonds of the cellulose and widen the space between the molecules in the pretreatment step.

The following processes for pretreatment and activation of cellulose, for this purpose, are known in the art: (1) the one stage pretreatment method in which acetic acid is sprayed on and mixed uniformly with the cellulose; (2) the two stage pretreatment method in which acetic acid is sprayed on the cellulose and then acetic acid containing sulfuric acid is sprayed on the cellulose; (3) a process wherein a wood pulp sheet is moistened with acetic acid or acetic acid containing sulfuric acid and then is crushed; and (4) the slurry pretreatment method in which wood pulp is disintegrated in water or dilute acetic acid aqueous solution to form a slurry and the liquid is removed and replaced with acetic acid repeatedly. Any one of the above-mentioned pretreatments can be used in the present invention, but it is essential that at least 25 parts by weight of acetic acid be used per 100 parts by weight of cellulose.

The second step is the acetylation step in which the pretreated and activated cellulose is acetylated to produce the primary cellulose acetate, which is substantially cellulose triacetate. The acetylating liquid mixture is composed of 200 to 400 parts by weight of acetic anhydride, 0 to 350 parts by weight of glacial acetic acid, and 0.5 to 5 parts by weight of sulfuric acid, as an acid catalyst. In order to keep the degree of polymerization of the final secondary cellulose acetate at a level that meets industrial requirements, the maximum temperature for acetylation should be determined depending on the amount of sulfuric acid used. The degree of polymerization should be maintained at a certain level at the end of the acetylation taking into account the degradation of the primary cellulose acetate that takes place in the subsequent hydrolyzing (or ripening) step. The maximum temperature is about 85° C. for 0.5 part by weight of sulfuric acid, about 77° C. for 1.0 part, about 67° C. for 3.0 parts, and about 65° C. for 5.0 parts. In order to control the temperature of the reaction and not exceed the maximum temperature during the final reaction, it is necessary to cool the mixture of acetic anhydride and acetic acid to a temperature of 15° C. to −5 °C., depending on the amount of sulfuric acid catalyst that is used. This temperature also depends on the total quantity of acetic anhydride and acetic acid used for the acetylation and on the cooling capacity of the jacket of the acetylator.

On addition of the pretreated, activated cellulose to the temperature-adjusted, mixed, acetylating liquid, the temperature of the reaction system increases at approximately a constant rate. Adjustments to the temperature of the system should be made so that the final temperature reaches 50° C. to 85° C. over a time period of 20 to 60 minutes. The final temperature should be maintained for 3 to 20 minutes while acetylation is completed.

The third step of the invention process is hydrolysis of excess acetic anhydride and neutralization of the sulfuric acid catalyst remaining in the reaction mixture containing the primary cellulose acetate obtained in the acetylation step. Neutralization is accomplished by adding an aqueous solution of a neutralizing agent, such as carbonates, acetates, hydroxides, or oxides of calcium, magnesium, iron, aluminun, or zinc. To effect complete neutralization of the sulfuric acid, the neutralizing agent should be used in an amount of 10% to 50% in excess of the stoichiometric amount required to neutralize all of the sulfuric acid added, as a catalyst, for acetylation. The resulting neutralized reaction mixture is transferred to a closed reactor, and the reaction mixture is heated to 125° C. to 170° C., preferably 140° C. to 160° C., by injecting steam directly into the reaction mixture. The reaction mixture is maintained at this temperature for 30 minutes to 6 hours depending upon the hydrolysis temperature in order to hydrolyze the primary cellulose acetate. The steam that condenses in the reaction mixture provides sufficient water for hydrolysis. As another method, it is also possible to add water in excess of the quantity required to effect hydrolysis to the reaction mixture after the sulfuric acid catalyst has been completely neutralized, and heat the reactants in a closed reactor to 125° to 170° C. by external heating.

According to Japanese Patent Laid-Open No. 59801/1981, the third step is accomplished by completely neutralizing sulfuric acid in the acetylation reaction mixture and then injecting steam directly to heat the reactants to 110° to 120° C. In contrast to this, according to this invention, ripening is accomplished at 125° to 170° C., preferably at 140° to 160° C., to produce the secondary cellulose acetate.

The fourth step is intended to stop the high-temperature hydrolysis reaction and simultaneously recover heat energy. In order to substantially stop the hydrolysis of the primary cellulose acetate in the high-temperature hydrolysis process, it is necessary to lower the temperature of the reaction system. This is accomplished in a simple manner by the so-called flashing cooling process, which also is effective for recovery of heat energy. The reaction mixture held in a closed reactor at 125° to 170° C. under pressure is flashed by discharging to the ambient atmosphere, or alternatively to a vacuum, so that the gaseous mixture of acetic acid and steam thereby generated is separated from the reaction mixture and is condensed by the condenser, and the resulting condensate is recovered as about an 80% aqueous solution of acetic acid.

On flashing, the reaction mixture cools rapidly to about 100° C. because energy equal to the latent heat of vaporization of the acetic acid and water is removed by the generation of this gas. If further flashing of the reaction mixture is performed under vacuum conditions, another batch of an about 80% aqueous acetic acid solution is recovered and the reaction mixture is cooled to about 40° C.

After this step, the reaction mixture is subjected to a separation step to remove the secondary cellulose acetate, which is then washed, stabilized and dried.

The technical concept of this invention is briefly described below.

In order to save energy and shorten the reaction time for acetylation of the cellulose, it is necessary to carry out the reaction at a high temperature. If sulfuric acid, as a catalyst, at such a high temperature, is used in the same amount as in the conventional acetylation process, the primary cellulose acetate undergoes excessive degradation with the result being that the acetate product does not meet industrial requirements. Decreasing the amount of sulfuric acid tends to hinder the uniform reaction of the cellulose. Thus, it is important to activate the material cellulose before the acetylation step. The pretreatment and activation step is effective to enlarge voids in the cellulose. Moreover, decreasing the amount of sulfuric acid also tends to hinder the decomposition of hemicellulose in wood pulp during the acetylation. Hemicellulose remaining undecomposed in the primary cellulose acetate impairs the filtering property, clarity, intrinsic viscosity, and spinning performance of the final cellulose diacetate. Decreasing the amount of sulfuric acid in the acetylation step also affects the hydrolysis reaction.

The primary cellulose acetate produced by using sulfuric acid, as a catalyst, is in the form of cellulose sulfate acetate, and the amount of the combined sulfate groups is approximately proportional to the amount of sulfuric acid used. Therefore, in an acetylation process using a small amount of sulfuric acid, the resulting cellulose sulfate acetate contains sulfate groups in smaller amounts and acetyl groups in larger amounts, as compared with the cellulose sulfate acetate prepared by the conventional large amount of catalyst process. This cellulose sulfate acetate is highly hydrophobic, and this makes it very difficult to introduce water, for hydrolysis of the cellulose sulfate acetate, into the system in the ripening step. As a result, partial separation of the primary cellulose acetate takes place, and the separated primary cellulose acetate does not dissolve in the conventional ripening process and it remains in the secondary cellulose acetate, thereby impairing the quality of the secondary cellulose acetate product. To be more specific, the secondary cellulose acetate does not form a uniform solution, but instead causes gelation, when the cellulose acetate product is dissolved in acetone.

In this invention, ripening is performed at a high temperature, 125° C. to 170° C., so as to increase the solubility of the acetic acid-water solvent mixture of the reaction system. Therefore, the above-mentioned hydrophobic primary cellulose acetate is completely dissolved and uniform hydrolysis can be accomplished. In addition, ripening at a high temperature promotes the decomposition or transformation of the aforesaid hemicellulose, and the physical properties of product cellulose acetate is thus not deteriorated.

The characteristics of the secondary cellulose acetate thus obtained by using high temperature hydrolysis can be confirmed by gel permeation chromatography. When secondary cellulose acetate dissolved in 95% acetone is tested, a chromatograph with a single peak is not obtained because one or more secondary peaks appear in the high-molecular weight region. It is considered that such a secondary peak, called a prehump, is not attributable to long-chain, high-molecular weight cellulose acetate, but to lower-molecular weight nondispersible aggregates composed of hemicellulose, sulfate groups, highly acetylated fractions, metal ions, etc. It is further considered that such aggregates adversely affect the filtering property, clarity, false viscosity, and spinning performance of the cellulose diacetate product. Thus, the quality of the cellulose diacetate product may be predicted based on the presence or absence of prehumps and the height of the prehumps in the gel permeation chromatograph. The cellulose acetate obtained by high-temperature hydrolysis in this invention generates chromatographs in which there are very few or no prehumps. The higher the hydrolysis temperature, the smaller the prehump, and the smaller the prehump, the more improved is the filtering property, false viscosity, and spinning performance.

As mentioned above, the present invention provides a process for producing cellulose diacetate of high quality from low-grade pulp and using less energy than the conventional process. This advantage is accomplished by the combination of acetylation at a high temperature for a short time with a small amount of sulfuric acid and hydrolysis at a high temperature.

The invention is described in detail with reference to the following illustrative examples, which do not limit the scope of the invention.

In the examples, the properties of cellulose acetate were measured according to the following methods:

Degree of acetylation: ASTM D-871 (1970, vol.15, p.272)

Viscosity: Expressed as time (in seconds) for a steel ball, 6.32 mm in diameter and 1.043 g in weight, to fall a distance of 10 cm in 20 wt.% cellulose acetate solution in 96% acetone, said solution being filled in a tube of 25.9 mm in internal diameter, at 25±0.1° C.

Degree of filtration: 20 wt.% cellulose acetate solution in 96% acetone is filtered at 50° C. using a filter cloth, and the amount filtered under a pressure is measured and the degree of filtration (KW) is calculated from the following equation.

$$KW = \frac{2 - \frac{P_2}{P_1}}{P_1 + P_2} \times 10^4$$

where
$P_1$ = quantity (cc) filtered during a 20 minute period beginning with the start of filtration.
$P_2$ = quantity (cc) filtered during a 40 minute period extending from 20 minutes to 60 minutes after the start of filtration.

Clarity: Transmittance at 640 nm of 5 wt.% cellulose acetate solution in acetone.

Yellowness index: Determined by a Hunter colorimeter for 12% cellulose acetate solution in a methylene chloride-methanol (9/1 by weight) liquid mixture.

The above used filter cloth consists of three kinds of fabric, the upper of calico or muslin S618, the middle of flannelet 9A the flocking side of which is placed upwardly and the lower of calico or muslin S618.

EXAMPLE 1

Sulfite pulp containing 96.5% of α-cellulose was pulverized and then dried to a 5% water content. This pulp was placed in the pretreatment apparatus, and 100 parts of glacial acetic acid was sprayed uniformly onto 100 parts of said pulp. For pretreatment and activation, the two components were mixed at 40° C. for 30 minutes. A previously cooled (12° C.) liquid mixture composed of 250 parts of acetic anhydride, 375 parts of acetic acid, and 1.0 part of sulfuric acid was introduced into a kneading type acetylator. The aforesaid pretreated and activated cellulose was charged in the acetylator and was mixed with the liquid mixture. The reactants generated heat, due to reaction of the acetic anhydride with water entrained with the starting cellulose and the reaction of the acetic anhydride with the cellulose. The acetylator was cooled with an external cooling device so that the temperature rose from about 16° C. to 77° C. over a period of 60 minutes, and the acetylator was further maintained at 77° C. for 12 minutes. In this manner acetylation was accomplished.

Then, 10 parts of 20% aqueous magnesium acetate solution was added to and mixed with the reaction mixture so as to completely neutralize sulfuric acid in the system, the amount of magnesium acetate being in excess of the amount theoretically required. The neutralized reaction mixture was transferred to an autoclave, and steam (5 Kg/cm²G) was injected into the closed autoclave so that the internal temperature thereof rose to 150° C. over the course of about 60 minutes. After maintaining the autoclave at 150° C. for 50 minutes, the reaction product was slowly flashed to the ambient atmosphere so that the reaction mixture was cooled to 100° C. and a gas composed of about 80% dilute acetic acid was separated. The remainder of the reaction mixture was added to dilute aqueous acetic acid solution with vigorous agitation, thereby permitting cellulose acetate to be separated in the form of flakes. After complete washing, the cellulose acetate flakes were dried.

The resulting cellulose acetate flakes were found to have an amount of combined acetic acid of 55.2%, a viscosity of 20 seconds, and a degree of filtration of 82, and to be superior in filtering property and spinning performance. The yellowness index was 7.5.

Secondary cellulose acetates were prepared under the same acetylation conditions as described above, but with the hydrolysis temperature being changed to 120° C., 130° C. and 140° C., respectively. The degree of filtration, clarity and yellowness index measured for the secondary cellulose acetates thus obtained are shown in Table 1. It was found that the higher the hydrolysis temperature, the better is the filtering property, and that the product becomes yellowish as the hydrolysis temperature is elevated.

TABLE 1

| Effect of Hydrolysis Temperature on Properties of Cellulose Diacetate | | | |
|---|---|---|---|
| Hydrolysis Temperature | Degree of Filtration | Clarity | Yellowness Index |
| 120° C. | 138 | 82% | 6.2 |
| 130° C. | 113 | 85% | 6.5 |
| 140° C. | 90 | 86% | 7.0 |
| 150° C. | 82 | 87% | 7.5 |

Samples of the secondary cellulose acetates obtained using the various hydrolysis temperatures described above were dissolved in 95% aqueous acetone solution. Gel permeation chromatographs for these solutions are shown in the attached drawing. For convenience of comparison, a common abscissa is used for the GPC curves of the individual samples, but the base line of the ordinate for each curve has been shifted. In the drawing, curve A denotes cellulose acetate obtained using the conventional hydrolysis, and curves B, C, D and E denote cellulose acetate obtained by using the hydrolysis temperatures at 120° C., 130° C., 140° C. and 150° C., respectively. A significant difference is noted in the distribution in the region for low elution volume of effluent, namely, the region in which substances of apparently high-molecular weight appear in the effluent. The lower the hydrolysis temperature, the larger becomes the area of the apparently high-molecular weight region. The secondary peaks, as distinguished from the main peak, are designated prehumps.

EXAMPLE 2

Sulfite pulp containing 96.5% of α-cellulose was pulverized and then dried to 6% water content. This pulp was placed in the pretreatment apparatus, and 35 parts of glacial acetic acid was sprayed uniformly onto 100 parts of the pulp which was regarded as containing about 5% water. For pretreatment and activation, the two components were mixed at 35° C. for 15 minutes. While the pretreatment apparatus was jacket-cooled to a temperature lower than 30° C., the reactants were sprayed with 40 parts of acetic acid containing 0.7 part of sulfuric acid, and then mixed for 15 minutes. A previously cooled (4° C.) liquid mixture composed of 270 parts of acetic anhydride, 380 parts of acetic acid, and 1.3 part of sulfuric acid was placed in a kneading type acetylator. The aforesaid pretreated and activated cellulose was charged in the acetylator and mixed with the liquid mixture. The acetylator was cooled with the external cooling device so that the temperature rose from about 8° C. to 72° C. over 50 minutes, and the acetylator was then maintained at 72° C. for 12 minutes. In this manner acetylation was accomplished.

Then, 20 parts of 20% aqueous sodium acetate solution was added with mixing so as to completely neutralize the sulfuric acid in the system, there being supplied an excess of sodium acetate above that required for neutralization. The reaction mixture was transferred to an autoclave, and steam (5 Kg/cm$^2$G) was injected into the closed autoclave so that the temperature reached 140° C. over about 70 minutes. After maintaining the autoclave at 140° C. for 80 minutes, the reaction mixture was slowly flashed by discharging it to the ambient atmosphere so that the reaction mixture was cooled to 100° C. and a gas containing about 80% dilute acetic acid was separated therefrom. As in Example 1, cellulose acetate in the form of flakes was obtained.

The resulting cellulose acetate flakes were found to have an amount of combined acetic acid of 54.9%, a viscosity of 19 seconds, a Hunter yellowness index of 7.0, and a degree of filtration of 110, and to be superior in filtration property and spinning performance.

EXAMPLE 3

Prehydrolysis kraft pulp containing 98.0% of α-cellulose was pulverized and then dried to 5% water content. This pulp was subjected to pretreatment and activation as described in Example 1. A previously cooled (−3° C.) liquid mixture composed of 280 parts of acetic anhydride, 350 parts of acetic acid, and 4.0 parts of sulfuric acid was placed in a kneading type acetylator. The aforesaid pretreated and activated cellulose was charged in the acetylator and mixed with the liquid mixture. The acetylator was cooled using an external cooling device so that the temperature rose from about 0° C. to 66° C. over 40 minutes, and then the acetylator was maintained at 66° C. for 16 minutes. In this manner acetylation was accomplished.

Then, 32 parts of 20% aqueous magnesium acetate solution were added with mixing so as to completely neutralize sulfuric acid in the system, the amount of magnesium acetate added being in excess of the amount theoretically required for neutralization. The reaction mixture was transferred to an autoclave, and steam (5 Kg/cm$^2$G) was injected into the closed autoclave so that the temperature reached 130° C. over about 60 minutes. After keeping the autoclave at 130° C. for 140 minutes, the reaction mixture was slowly flashed by discharging it to the ambient atmosphere so that the reaction mixture was cooled to 100° C. and a gas of about 80% dilute acetic acid was separated. As described in Example 1, cellulose acetate in the form of flakes was obtained.

The resulting cellulose acetate flakes were found to have an amount of combined acetic acid of 55.4%, a viscosity of 26 seconds, a Hunter yellowness index of 6.2, and a degree of filtration of 130, and to be superior in the filtration property and spinning performance.

COMPARATIVE EXAMPLE 1

Sulfite pulp containing 96.5% of α-cellulose was pulverized and then dried to 5% water content. This pulp was placed in the pretreatment apparatus, and 25 parts of glacial acetic acid was sprayed uniformly onto 100 parts of the pulp. To carry out pretreatment and activation, the two components were mixed at 40° C. for 30 minutes. A previously cooled (10° C.) liquid mixture composed of 270 parts of acetic anhydride, 430 parts of acetic acid, and 1.5 parts of sulfuric acid was placed in a kneading type acetylator. The aforesaid pretreated and activated cellulose was charged in the acetylator and mixed with the liquid mixture. The acetylator was cooled with an external cooling device so that the temperature rose from about 14° C. to 74° C. over 50 minutes, and then the acetylator was kept at 74° C. for 12 minutes. In this manner acetylation was accomplished.

Then, 14 parts of 20% aqueous magnesium acetate solution were added with mixing so as to completely neutralize sulfuric acid in the system, with an excess of magnesium acetate being supplied. The reaction mixture was transferred to an autoclave, and steam (5 Kg/cm$^2$G) was injected into the closed autoclave so that the temperature reached 120° C. over about 50 minutes. After maintaining the autoclave at 120° C. for 220 minutes, the reaction mixture was slowly flashed by discharging it to the ambient atmosphere so that the reaction mixture was cooled to 100° C. and a gas of about 80% dilute acetic acid was separated therefrom. As described in Example 1, cellulose acetate in the form of flakes was obtained. This Comparative Example employs the combination of high-temperature acetylation and high-temperature (120° C.) hydrolysis as disclosed in Japanese Patent Laid-Open No. 59801/1981.

The resulting cellulose acetate flakes were found to have an amount of combined acetic acid of 54.9%, a viscosity of 25 seconds, a Hunter yellowness index of 6.2, and a degree of filtration of 150.

COMPARATIVE EXAMPLE 2

Sulfite pulp containing 96.5% of α-cellulose was disintegrated and then dried to 5% water content. This pulp was placed in the pretreatment apparatus, and 100 parts of glacial acetic acid were sprayed uniformly onto 100 parts of the pulp. For pretreatment and activation, the two components were mixed at 40° C. for 90 minutes. A previously cooled (−15° C.) liquid mixture composed of 280 parts of acetic anhydride, 350 parts of acetic acid, and 14 parts of sulfuric acid was placed in a kneading type acetylator. The aforesaid pretreated and activated cellulose was charged in the acetylator and mixed with the liquid mixture. The contents were allowed to reach 35° C. over about 120 minutes, and then were kept at this temperature for the next 60 minutes. In this manner acetylation was accomplished.

The contents were then mixed during addition of 50 parts of water with agitation for 30 minutes. The reactant product was transferred to the ripening reactor for hydrolysis at 35° C. for 30 hours. After the reaction was complete, 120 parts of 20% aqueous sodium acetate solution was added to completely neutralize sulfuric acid. Subsequently, the process was carried to completion as described in Example 1.

Comparative Example 2 employs the conventional process which uses a large amount of sulfuric acid and performs the acetylation reaction and hydrolysing at low temperatures. The resulting cellulose acetate flakes were found to have an amount of combined acetic acid of 54.8%, a viscosity of 24 seconds, a Hunter yellowness index of 6.0, and a degree of filtration of 145, and to be of the standard commercial quality with respect to the filtration property and spinning performance.

COMPARATIVE EXAMPLE 3

As described in Comparative Example 2, 200 parts of pretreated and activated cellulose were obtained. A pre-cooled (4° C.) liquid mixture composed of 280 parts of acetic anhydride, 355 parts of acetic acid, and 2 parts of sulfuric acid was placed in a kneading type acetylator. The aforesaid pretreated and activated cellulose was charged in the acetylator and mixed with the liquid mixture. The contents were allowed to reach 70° C. from 9° C. over about 6 minutes and were kept at 70° C. for 12 minutes. In this manner, acetylation was accomplished.

The contents were then mixed during addition of a mixture composed of 3 parts of sulfuric acid and 40 parts of water, with agitation. The reaction product was transferred to an ripening reactor for hydrolysis at 35° C. for 35 hours. Subsequently, the process was carried to completion as described in Example 1.

Comparative Example 3 employs the conventional process which performs acetylation with a small amount of sulfuric acid and conducts hydrolysing at a low temperature. The resulting cellulose acetate flakes were found to have an amount of combined acetic acid of 55.2%, a viscosity of 16 seconds, a Hunter yellowness index of 5.9, and a degree of filtration in excess of 1000. The product was poor in the filtration property.

The embodiments of the invention in which an exclusive property or privilege is claimed are defined as follows:

1. A process for producing cellulose diacetate which comprises the steps of:
   (a) pretreating and activating 100 parts by weight of cellulose to prepare same for acetylation, then adding to said activated cellulose a mixture of 200 to 400 parts by weight of acetic anhydride, 0 to 350 parts by weight of glacial acetic acid, and 0.5 to 5 parts by weight of acid catalyst to form a reaction mixture, raising the temperature of the reaction mixture to a temperature in the range of from 50° C. to 85° C. at an approximately constant rate, and then maintaining said reaction mixture at said temperature for 3 to 20 minutes, thereby acetylating said cellulose to form primary cellulose acetate;
   (b) then neutralizing said acid catalyst in the reaction mixture containing the primary cellulose acetate obtained in step (a) and placing said reaction mixture in a pressure system, then introducing steam under pressure into the system to change the temperature of said system to a temperature in the range of 125° C. to 170° C., and then maintaining the system at the latter temperature for 30 minutes to 6 hours, thereby hydrolyzing said primary cellulose acetate to form a secondary cellulose acetate comprising cellulose diacetate;
   (c) then flashing said system by discharging same to the ambient atmosphere or a vacuum, recovering by condensation the gas generated by the flashing, said gas having a weight ratio of acetic acid/water of 70–80%/30–20%, and simultaneously cooling the remainder of the reaction mixture to about 100° C., thereby substantially stopping the hydrolysis reaction; and
   (d) recovering said cellulose diacetate from said cooled reaction mixture.

2. A process as claimed in claim 1, wherein in said pretreating and activating step, said cellulose is treated with at least 25 parts by weight acetic acid per 100 parts by weight of said cellulose.

3. A process as claimed in claim 1, wherein said acid catalyst is sulphuric acid.

4. A process as claimed in claim 3, wherein said acetic anhydride and said acetic acid are at a temperature in the range of 15° C. to −5° C. immediately prior to the addition of said mixture.

5. A process as claimed in claim 1, wherein in said step (b), said steam under pressure is introduced to change the temperature of said pressure system to a temperature in the range of 140° C. to 160° C.

6. A process as claimed in claim 1, wherein said acid catalyst is neutralized with a neutralizing agent selected from the group consisting of carbonates, acetates, hydroxides, and oxides of calcium, magnesium, iron, aluminum or zinc.

7. A process as claimed in claim 6, wherein said neutralizing agent is used in an amount 10 to 50% in excess of the stoichiometric amount required for neutralization of said acid catalyst.

8. A process as claimed in claim 1, wherein said cellulose diacetate is of sufficient purity such that substantially only a single peak is obtained when said cellulose diacetate is subjected to gel permeation chromatography.

9. A process as claimed in claim 1, wherein said cellulose diacetate has a degree of filtration in the range of 82 to 113, and has a clarity of at least 85%.

10. A process for producing cellulose diacetate which comprises the steps of:
    (a) treating 100 parts by weight of cellulose with at least 25 parts by weight of acetic acid to activate said cellulose and to prepare same for acetylation, then adding to said activated cellulose a reactant mixture having a temperature of from −5° C. to +15° C. and consisting essentially of 200 to 400 parts by weight of acetic anhydride, 0 to 350 parts by weight of glacial acetic acid, and 0.5 to 5 parts by weight of sulfuric acid whereby to form a reaction mixture, raising the temperature of the reaction mixture to a temperature in the range of from 65° C. to 85° C. at an approximately constant rate, and then maintaining said reaction mixture at said temperature for 3 to 20 minutes, thereby acetylating said cellulose to form primary cellulose acetate;
    (b) then neutralizing said acid catalyst in the reaction mixture containing the primary cellulose acetate obtained in step (a) and placing said reaction mixture in a pressure system, then introducing steam under pressure into the system to change the temperature of said system to a temperature in the range of 125° C. to 170° C., and then maintaining the system at the latter temperature for 30 minutes to 6 hours, thereby hydrolyzing said primary cellulose acetate to form a secondary cellulose acetate comprising cellulose diacetate;
    (c) then flashing said system by discharging same to the ambient atmosphere or a vacuum, recovering by condensation the gas generated by the flashing, said gas having a weight ratio of acetic acid/water of 70–80%/30–20%, and simultaneously cooling the remainder of the reaction mixture to about 100° C., thereby substantially stopping the hydrolysis reaction; and
    (d) recovering said cellulose diacetate from said cooled reaction mixture.

* * * * *